United States Patent
Elwan et al.

(10) Patent No.: US 9,059,642 B2
(45) Date of Patent: Jun. 16, 2015

(54) DIGITALLY CONTROLLED SPUR MANAGEMENT TECHNIQUE FOR INTEGRATED DC-DC CONVERTERS

(75) Inventors: Hassan Elwan, Lake Forest, CA (US); Ahmed Emira, Lake Forest, CA (US)

(73) Assignee: Atmel Corporation, San Jose, CA (US)

( * ) Notice: Subject to any disclaimer, the term of this patent is extended or adjusted under 35 U.S.C. 154(b) by 253 days.

(21) Appl. No.: 13/592,113

(22) Filed: Aug. 22, 2012

(65) Prior Publication Data

US 2014/0055117 A1 Feb. 27, 2014

(51) Int. Cl.
*H02M 1/44* (2007.01)
*H02M 3/156* (2006.01)
*H02M 3/158* (2006.01)

(52) U.S. Cl.
CPC .............. *H02M 1/44* (2013.01); *H02M 3/1588* (2013.01); *H02M 3/156* (2013.01)

(58) Field of Classification Search
CPC .......... H02M 1/44; H02M 2001/0012; H02M 2001/0041; H02M 3/156; H02M 3/157; H02M 3/1588
USPC ......................................... 323/282, 283, 351
See application file for complete search history.

(56) References Cited

U.S. PATENT DOCUMENTS

| | | | | |
|---|---|---|---|---|
| 5,537,305 | A * | 7/1996 | Colotti | 363/39 |
| 7,733,673 | B2 * | 6/2010 | Balakrishnan et al. | 363/21.13 |
| 8,239,694 | B2 * | 8/2012 | Saha et al. | 713/300 |
| 8,514,595 | B1 * | 8/2013 | Husted et al. | 363/39 |
| 2006/0072350 | A1 * | 4/2006 | Mitrosky et al. | 363/39 |
| 2006/0220469 | A1 * | 10/2006 | Goto et al. | 307/106 |
| 2007/0191073 | A1 * | 8/2007 | May et al. | 455/572 |
| 2011/0074211 | A1 * | 3/2011 | Hampo et al. | 307/9.1 |
| 2014/0119062 | A1 * | 5/2014 | Nishijima | 363/21.02 |

* cited by examiner

*Primary Examiner* — Fred E Finch, III
(74) *Attorney, Agent, or Firm* — Fish & Richardson P.C.

(57) ABSTRACT

An integrated circuit for digital controlling switching noise spurs in a receiver by shifting a switching frequency ($f_s$) to a clock frequency ($f_s+\Delta f$) to move a $K^{th}$ harmonic of the switching frequency ($f_s$) is provided. The integrated circuit includes a spur controlled clock that operates the clock frequency ($f_s+\Delta f$), and a DC-DC converter circuitry that includes a first power switch, and a second power switch. The first power switch and the second power switch are driven by the clock frequency ($f_s+\Delta f$). $\Delta f$ ranges from $$\frac{(f_{RF} - Kf_s) + BW}{K} \text{ to } \frac{(f_{RF} - (K-1)f_s) - BW}{K-1},$$

and $f_{RF}$ is center frequency of a received channel. None of the harmonics of the clock frequency ($f_s+\Delta f$) is present in a channel of interest. The switching frequency is larger than the channel bandwidth 2BW.

19 Claims, 7 Drawing Sheets

DIGITALLY CONTROLLED SPUR MANAGEMENT TECHNIQUE FOR INTEGRATED DC-DC CONVERTERS

BACKGROUND

1. Technical Field

The embodiments herein generally relate to spur management techniques, and, more particularly, to digitally controlled spur management techniques for DC-DC converters integrated with an electrical circuit.

2. Description of the Related Art

DC-DC converters are switching regulators that provide well regulated voltage from unregulated input voltage (usually a battery in mobile applications). The DC-DC converter is very noisy due to the fact that it switches large current values in order to supply the total current of all digital and analog circuits supplied by its output. The switching frequency of the DC-DC converter may be load independent, in a continuous mode of operation, or load dependent in a discontinuous mode of operation. In a continuous mode of operation, spurs of the DC-DC switching frequency '$f_s$' (e.g., a sampling frequency) occur at only integer multiples of the switching frequency. Sampling frequency or a sample rate defines the number of samples per unit of time (usually seconds) taken from a continuous signal to make a discrete signal.

The ever shrinking size of MOS transistors enables the integration of more functionality in a smaller die area. The drive to lower the cost of consumer products has motivated the integration of analog circuits together with noisy digital circuits. Noise shielding techniques are used to minimize the performance degradation of noisy digital circuits that become in close proximity with the sensitive analog circuits. There remain, however, some noisy circuits, such as switching DC-DC converters that typically cannot be integrated with sensitive analog circuit due to their high level of switching noise. The spurs (e.g., harmonic distortion component) level of this switching noise at the frequency band of interest in the analog circuits is often unacceptable or at least uncontrollable.

Several coupling mechanisms (e.g. substrate, magnetic, power supply, etc.) cause these spurs to reach the sensitive analog circuits. This spur issue has prevented integration of DC-DC converters with spur-sensitive analog circuits and kept the DC-DC converter as an off-chip component. However, by making the DC-DC converter an off-chip component leads to increase in size and cost of the overall solution. Further, adding off-chip capacitors to filter the noise will not help if the DC-DC converter is integrated. This is because the high switching current has to flow from the on-chip power switches to the off-chip capacitor. Therefore, the size of the current loop becomes large, increasing magnetic coupling to sensitive on-chip analog RF circuits.

DC-DC switching noise coupling into the analog/RF section can degrade the performance of the entire receiver. In the case of a weak received desired signal level (limiting case would be a signal at near the sensitivity of the receiver), the digital noise level coupling into the input of the LNA may be on the same order of magnitude, indeed may even be larger, than the RF desired signal itself. In such cases, the total receiver sensitivity is degraded by an amount equal to the increase in receiver noise figure due to digital noise coupling.

Switching noise coupling into sensitive RF circuitry is the main bottleneck behind integrating an RF receiver on the same substrate, or even in the same package, with a switching DC-DC converter. One major form of coupling is magnetic (inductive). Unlike resistive and capacitive coupling, inductive coupling does not depend on material type or material depth. It is understood that any conductive closed loop with time varying electric current flowing through the loop will produce a magnetic field. Similarly, any conductive closed loop subjected to a time varying magnetic field will conduct electric current.

The simplest and most effective method to reduce the magnetic coupling effect is to increase the physical separation between the two loops. Due to the advancement in technology, the die size includes smaller feature sizes and hence the physical separation one can achieve between the digital (aggressor) and analog circuitry (victim) is constantly reducing. Hence, in modern nanometer technology, separating the DC-DC converter and analog circuits by large distances is no longer possible especially if a small die area is the target for lower cost and higher yield.

Scaling of integrated circuit technology has allowed the industry to integrated more functions on the same chip. One of the recent trends is to try to integrate the entire system into a single package (system-in-a-package or SiP) or a single chip (system-on-a-chip or SoC). If the DC-DC converter is to be integrated within the same package or in the same chip, it will be in very close proximity to the sensitive analog circuitry. If one or more of the spurs/harmonics of the DC-DC switching frequency falls in a frequency band of interest of the wireless receiver, it will generally corrupt the reception of the desired signal. Accordingly, there remains a need for a new technique to digitally control spurs for integrated DC-DC converters.

SUMMARY

In view of the foregoing, an embodiment herein provides an integrated circuit for digital controlling switching noise spurs in a receiver by shifting a switching frequency ($f_s$) to a clock frequency ($f_s+\Delta f$) to move a $K^{th}$ harmonic of the switching frequency $f_s$). The integrated circuit includes a spur controlled clock that operates the clock frequency ($f_s+\Delta f$), and a DC-DC converter circuitry that includes a first power switch, and a second power switch. The first power switch and the second power switch are driven by the clock frequency ($f_s+\Delta f$). $\Delta f$ ranges from $$\frac{(f_{RF} - Kf_s) + BW}{K} \text{ to } \frac{(f_{RF} - (K-1)f_s) - BW}{K-1},$$

and wherein $f_{RF}$ is center frequency of a received channel. None of the harmonics of the clock frequency ($f_s+\Delta f$) is present in a channel of interest. The switching frequency is larger than the channel bandwidth 2BW.

The $K^{th}$ harmonic of the switching frequency is shifted to a higher frequency at $Kf_s+K\Delta f$, when $\Delta f$ is the frequency shift. The channel of interest at $f_{RF}$ is placed in the middle between two consecutive harmonics at $(K-1)(f_s+\Delta f)$ and $K(f_s+\Delta f)$. $\Delta f$ is calculated in accordance with $$\Delta f = \frac{2f_{RF}}{2K-1} - f_s.$$

A value of K is chosen to minimize the switching frequency shift $\Delta f$ for a given channel of interest at $f_{RF}$.

In another aspect, a combined integrated circuit for digital controlling switching noise spurs in a receiver by shifting a switching frequency ($f_s$) to a clock frequency ($f_s+\Delta f$) to move a $K^{th}$ harmonic of the switching frequency ($f_s$) is provided. The combined integrated circuit includes a spur controlled clock that operates the clock frequency ($f_s+\Delta f$), and a DC-DC converter circuitry operatively coupled to analog circuitry. The DC-DC converter includes a first power switch, and a second power switch. The first power switch and the second power switch are driven by the clock frequency ($f_s+\Delta f$). $\Delta f$ is calculated in accordance with an equation:

$$\Delta f = \frac{2f_{RF}}{2K-1} - f_s,$$

and $f_{RF}$ is center frequency of the received channel. None of the harmonics of the clock frequency ($f_s+\Delta f$) is present in a channel of interest. The switching frequency is larger than the channel bandwidth 2BW.

The $K^{th}$ harmonic of the switching frequency may be shifted by $\Delta f$ when the switching frequency is greater than the channel bandwidth 2BW. An absolute value of $\Delta f$ may be determined based on a value of K and $f_{RF}$. The value of K is chosen to minimize the switching frequency shift $\Delta f$ for a given channel of interest at $f_{RF}$. $\Delta f$ is a minimum frequency shift of −37.267 KHz when the value of K is 81, $f_{RF}$ is 481 MHz, and $f_s$ is 8 MHz. $\Delta f$ ranges from $$\frac{(f_{RF} - Kf_s) + BW}{K} \text{ to } \frac{(f_{RF} - (K-1)f_s) - BW}{K-1}.$$

In yet another aspect, a method for digital controlling switching noise spurs in a DC-DC converter is provided. The method includes calculating a location of a $K^{th}$ harmonic of a switching frequency in the DC-DC converter, and shifting the $K^{th}$ harmonic of the switching frequency ($f_s$) to a clock frequency ($f_s+\Delta f$) based on the location such that none of the harmonics of the clock frequency ($f_s+\Delta f$) is present in a channel of interest.

The Kth harmonic of the switching frequency may be shifted to a higher frequency at Kf_s+KΔf, when Δf is the frequency shift. The channel of interest at $f_{RF}$ may be placed in the middle between two consecutive harmonics at (K−1) ($f_s+\Delta f$) and K($f_s+\Delta f$). $\Delta f$ is calculated such that a received channel is located in the middle of two consecutive harmonics of the switching frequency ($f_s$). The switching frequency may be larger than the channel bandwidth 2BW. The $K^{th}$ harmonic of the switching frequency ($f_s$) is shifted by 'Δf' when the switching frequency ($f_s$) is greater than 2BW. Δf ranges from $$\frac{(f_{RF} - Kf_s) + BW}{K} \text{ to } \frac{(f_{RF} - (K-1)f_s) - BW}{K-1},$$

and $f_{RF}$ is center frequency of the received channel. Δf is calculated in accordance with $$\Delta f = \frac{2f_{RF}}{2K-1} - f_s.$$

The shifting of $K^{th}$ harmonic of the switching frequency ($f_s$) is performed and controlled by a clock phase lock loop (PLL).

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
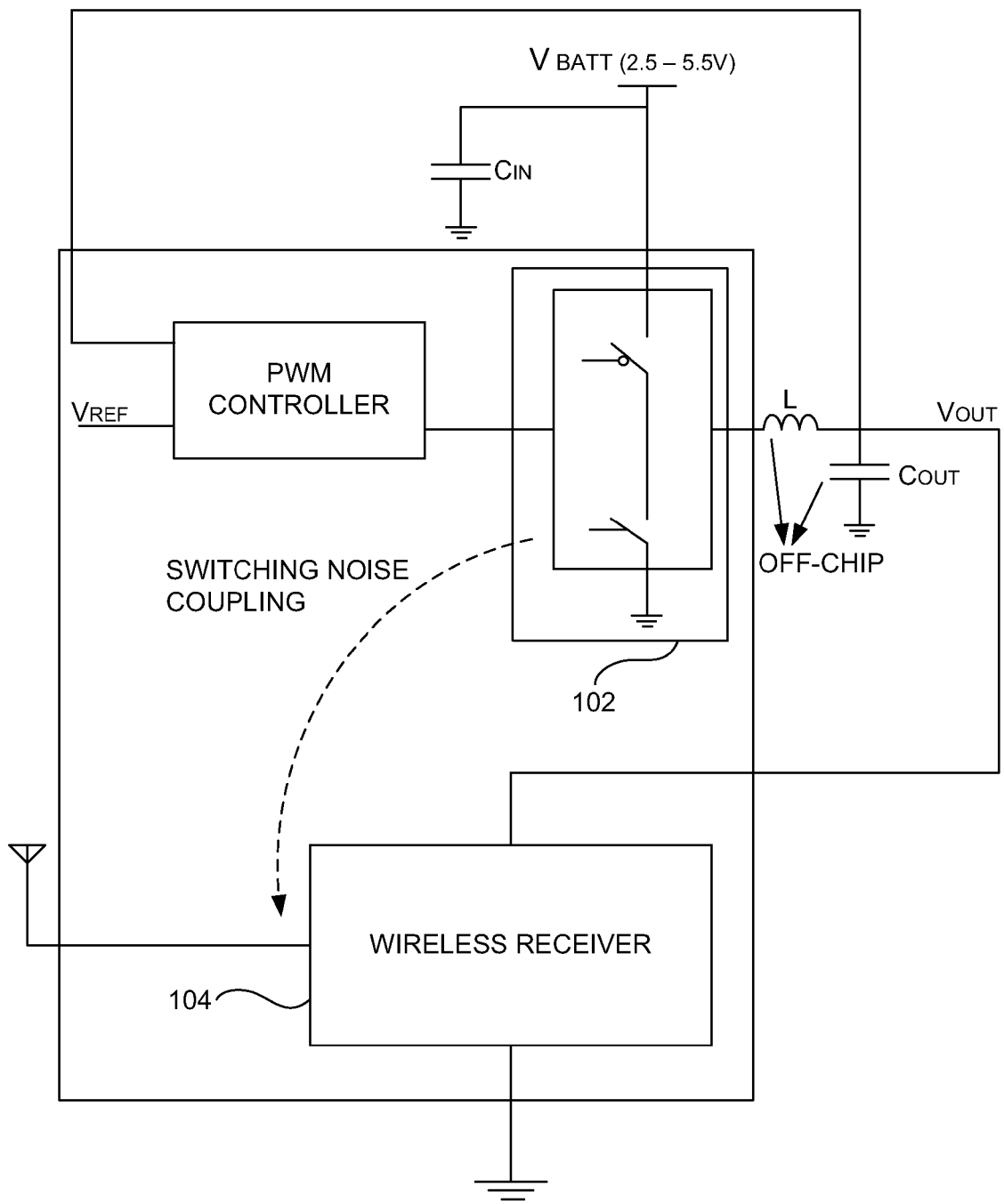
FIG. 1 illustrates a wireless receiver integrated with a DC-DC converter on a same single chip according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new technique to digitally control spurs for integrated DC-DC converters. The embodiments herein achieve this by providing a technique that calculates the spectral location of the spurs coupled from the switching DC-DC circuits and modifies the switching frequency "$f_s$" in such a way to move the switching spurs away from the analog band of interest. Since the switching spurs are evenly spaced in the frequency domain where the spacing is equal to the switching frequency, the necessary condition for this technique to be used is to make sure that the analog band of interest is smaller than the DC-DC switching frequency. This frequency shift is achieved by changing the clock frequency that drives the DC-DC power switches. Referring now to the drawings, and more particularly to FIGS. 1 through 10, where similar reference characters denote corresponding features consistently throughout the figures, there are shown preferred embodiments. The values provided in the figures are examples only, and the embodiments herein are not necessarily restricted to any particular numerical value or range provided in the drawings.

FIG. 1 illustrates a wireless receiver 104 integrated with a DC-DC converter 102 on a same single chip according to an embodiment herein. Due to the close proximity of the DC-DC converter 102 to the wireless receiver 104, significant switching noise couples from the DC-DC converter 102 to the input of the wireless receiver 104 at which the received signal level is very small.

Figure 2:
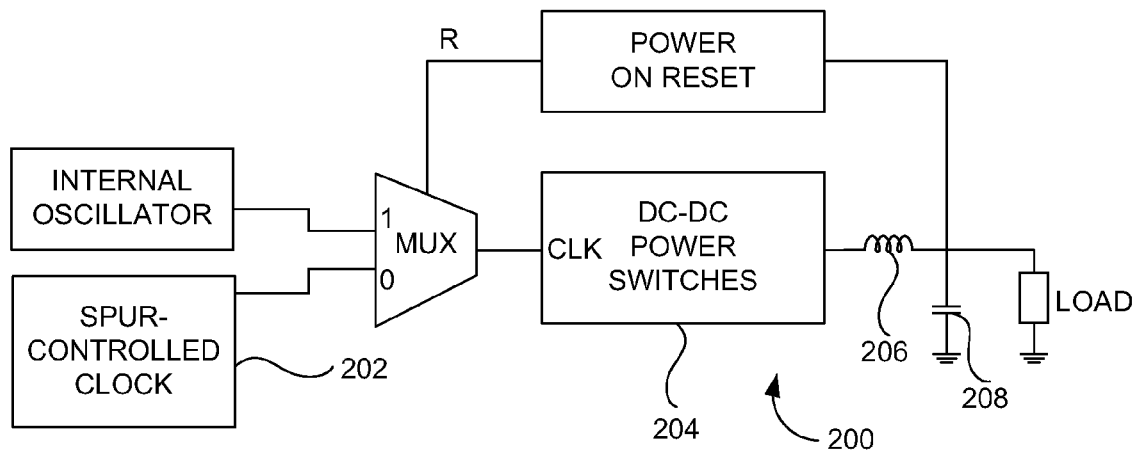
FIG. 2 illustrates a DC-DC converter with a clock selection according to an embodiment herein.

FIG. 2, with reference to FIG. 1, illustrates a DC-DC converter circuit with a clock selection 200 according to an embodiment herein. The DC-DC converter circuit with the clock selection 200 includes an internal oscillator 201, a spur controlled clock 202, a multiplexer 203, a DC-DC converter with one or more power switches 204, a power-ON reset mechanism 205, an inductor 206, a capacitor 208, and a resistive load 210. The spur controlled clock 202 is operatively coupled to the DC-DC converter circuitry. By changing the frequency of the spur controlled clock 202 from fs to fs+Δf, the $K^{th}$ harmonic of switching frequency is shifted from Kfs to K($f_s$+Δf). Therefore, a small shift of Δf in the switching frequency, results in a larger shift KΔf in the $K^{th}$ harmonic. Shifting clock frequency with fine frequency steps may be performed using fractional phase locked loop (PLL). The frequency shift Δf is chosen such that the RF channel of interest falls in the middle between two consecutive harmonics of the switching frequency. As a result, a necessary condition for the channel of interest to be free of spurs is to set the DC-DC switching frequency larger than the channel bandwidth. The inductor 206 may be operatively coupled to the DC-DC converter circuit 204. The capacitor 208 may be operatively coupled to the inductor. The resistive load 210 is operatively coupled to the capacitor 206.

Figure 3:
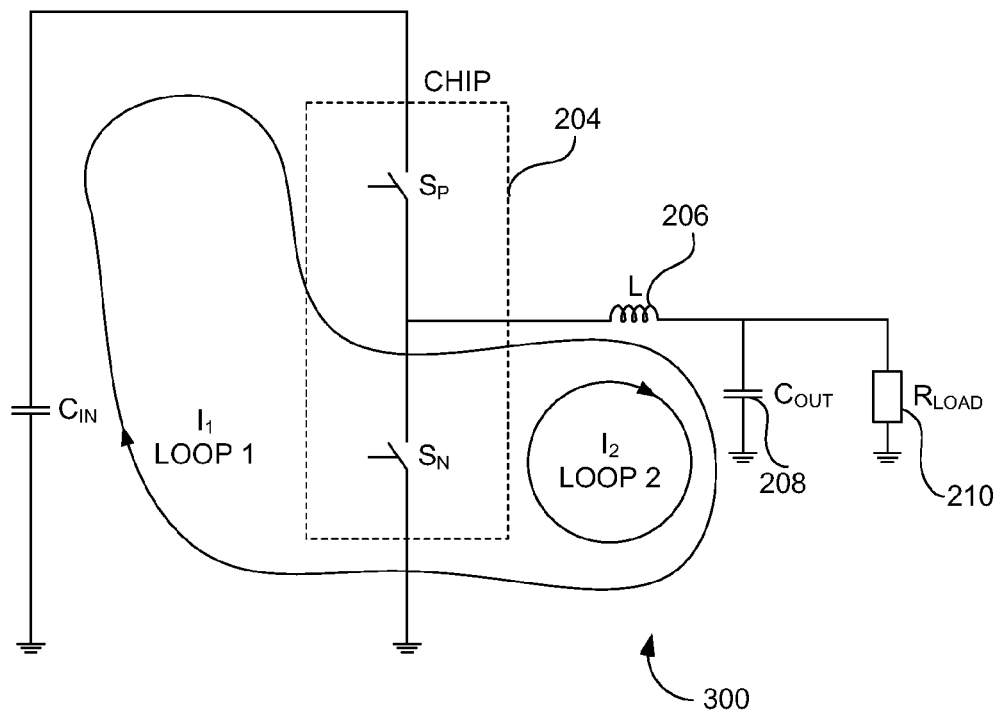
FIG. 3 illustrates a step-down DC-DC converter with large current loops according to an embodiment herein.

FIG. 3, with reference to FIGS. 1 and 2, illustrates a step-down DC-DC converter 300 with large current loops according to an embodiment herein. The two switches $S_P$ and $S_N$ are the DC-DC integrated power switches. The passive elements $C_{IN}$, L, and $C_{OUT}$ are usually placed as off-chip components. In one phase, the power switch Sp is turned ON while the power switch $S_N$ is turned OFF. Thus, the inductor 206 starts charging and the current flows in loop 1 (which involves $C_{IN}$, $S_P$, L, $C_{OUT}$, and $R_{LOAD}$). In the next phase, the power switch $S_P$ is turned OFF while the power switch $S_N$ is turned ON. Thus, the inductor 206 starts discharging and the current flows in loop 2 (which involves $S_N$, L, $C_{OUT}$, and $R_{LOAD}$). Therefore, the size of the current loop changes between the first and second phases. This size-switching current loop generates time-varying magnetic field which may couple to other spur-sensitive loops in the wireless receiver 104 in FIG. 1, such as the RF input loop which involves the antenna and input stage of the receiver.

Figure 4:
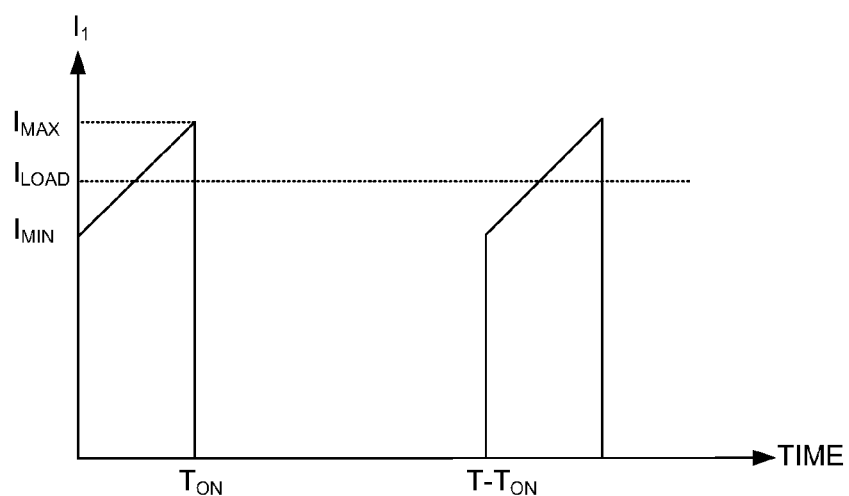
FIG. 4 is a graphical representation illustrating current waveforms of the step-down DC-DC converter of FIG. 3 according to an embodiment herein.
Figure 4:
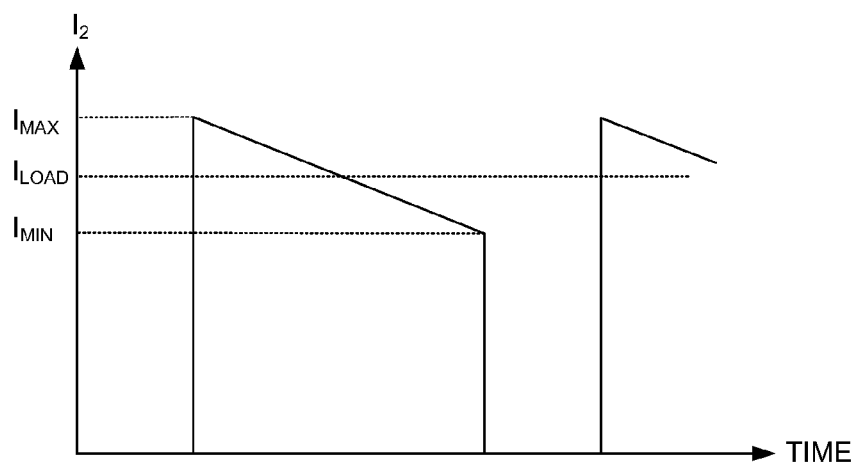
Figure 4:
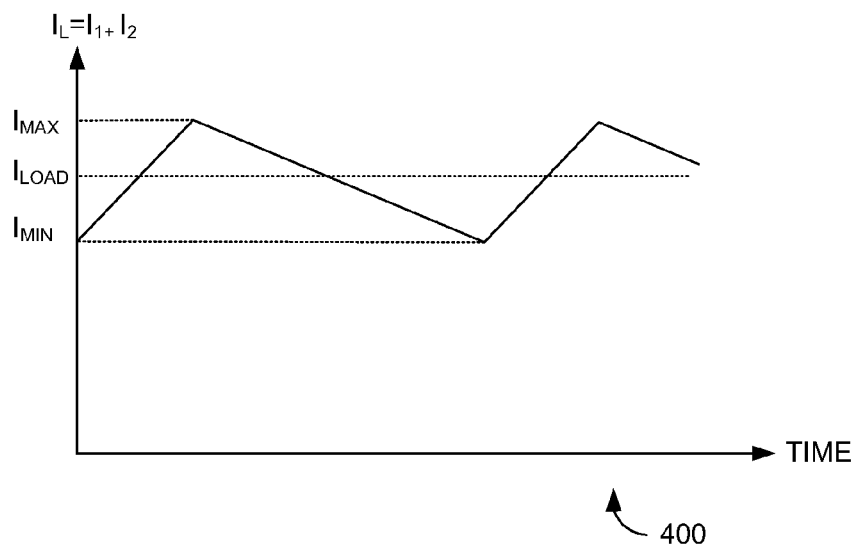

FIG. 4, with reference to FIGS. 1 through 3, is a graphical representation 400 illustrating current waveforms of the step-down DC-DC converter 300 of FIG. 3 according to an embodiment herein. The graphical representation 400 illustrates waveforms of the currents in the loop 1 ($I_1$), the loop 2 ($I_2$), and an inductor current ($I_L = I_1 + I_2$) plotted along the Y axis with respect to time along the X axis. It is to be understood that the large discontinuities in the waveforms of $I_1$ and $I_2$ translate to large high frequency harmonic components. These high frequency harmonics magnetically couple to sensitive analog circuits and interfere with the RF frequency band of interest. These two current loops generate a magnetic field which couples to the analog input loop of the low noise amplifier (LNA). Hence, switching noise at integer multiples of the switching frequency appears in the sensitive analog circuitry. The amount of coupling depends on the mutual coupling between the two closed loops and is given by:

$$M = \frac{\mu}{4\pi} \cdot \frac{A_1 A_2}{d^3} \qquad (1)$$

where μ is the permeability of the medium, $A_1$ is the area defining the closed loop path of the analog circuitry, $A_2$ is the area of the closed loop path defining the DC-DC converter circuitry (the loop 1 and the loop 2 in FIG. 3), and d is the center point distance of the two paths. It is evident that the magnetic coupling between the two loops is inversely proportional to the cubic distance between the two loops. This shows the continuous shrinking of size of electronic circuits results in dramatic increase of noise coupling from the "aggressor" to the "victim" circuits.

The frequency dependent voltage noise induced in the analog circuitry by magnetic coupling is given as:

$$V_n(\omega) = \omega \cdot M \cdot I(\omega) \qquad (2)$$

where ω is the frequency in radians, M is the mutual coupling given by equation (1), I(ω) is the frequency domain representation of the periodic current waveform of the DC-DC converter circuitry.

The DC-DC converter power switches, which are the main source of noise, operate at a constant frequency in continuous mode of operation. Therefore, the loop currents $I_1(t)$ and $I_2(t)$ are periodic with period T which is the inverse of the switching frequency $f_s$. The frequency domain representation of the current $I_1(t)$, for example, shown in FIG. 4 can be expressed as:

$$I_1(\omega) = \frac{a_0}{2} + \sum_{n=1}^{\infty} a_n \cos(2n\pi f_s t) + b_n \cos(2n\pi f_s t). \qquad (3)$$

Therefore, $I_1(\omega)$ contains spurs at integer multiples of the switching frequency. The magnitude of these spurs is determined by the coefficients $a_n$ and $b_n$ which are expressed as:

$$a_n = \frac{I_{LOAD}}{n\pi} \sin\left(n\pi \frac{T_{ON}}{T}\right) \qquad (4)$$

$$b_n = \frac{4\Delta IT}{(n\pi)^2 T_{ON}}\left[\sin\left(n\pi \frac{T_{ON}}{T}\right) - n\pi \frac{T_{ON}}{T} \cos\left(n\pi \frac{T_{ON}}{T}\right)\right] \qquad (5)$$

where $\Delta I = (I_{max} - I_{min})/2$. The magnitude of the spurs a frequency $nf_s$ is equal to:

$$c_n = \sqrt{a_n^2 + b_n^2} \qquad (6)$$

Figure 5:
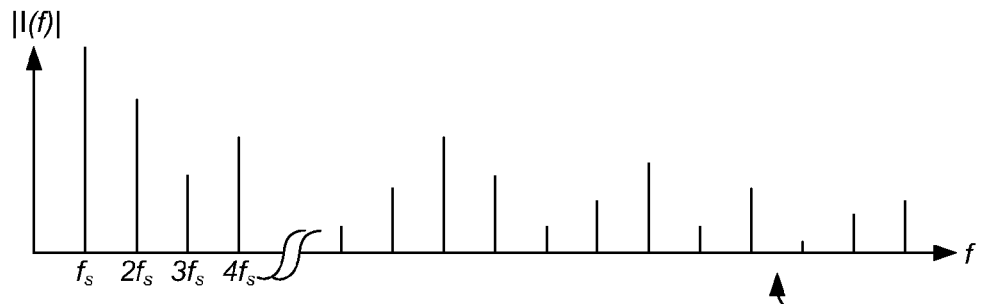
FIG. 5 is a graphical representation illustrating DC-DC current spurs in the frequency domain according to an embodiment herein.

This means that the spurs from the DC-DC converter power switches can be modeled as an array of impulses which are $f_s$ apart with magnitudes given by equation (6) as shown in FIG. 5. In particular, FIG. 5, with reference to FIGS. 1 through 4, is a graphical representation 500 illustrating DC-DC current spurs along the Y axis in the frequency domain along the X axis according to an embodiment herein. The fast switching nature of the DC-DC power switches means that the load current ($I_1$ and $I_2$ in FIG. 4) has a high frequency content that extends all the way to the RF analog band of interest (e.g., the channel of interest).

Figure 6:
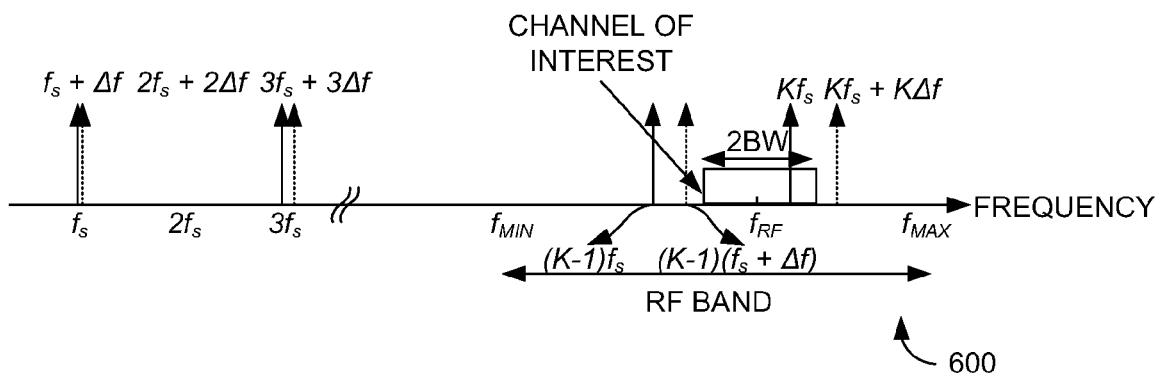
FIG. 6 is a graphical representation illustrating a frequency spectrum with a RF band of interest according to an embodiment herein.
Figure 7:
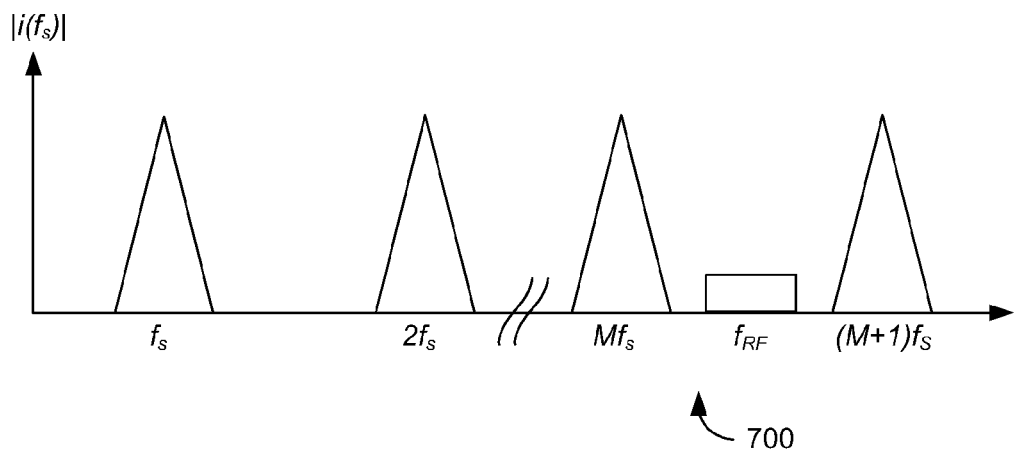
FIG. 7 is a graphical representation illustrating optimal channel placement in the middle of two $f_s$ harmonics according to an embodiment herein.

FIG. 6, with reference to FIGS. 1 through 5, is a graphical representation 600 illustrating a frequency spectrum with RF band of interest (the channel of interest) according to an embodiment herein. The switching frequency or the sampling frequency '$f_s$' is shifted to a different frequency such that none of the harmonics of $f_s$ resides in the RF channel of interest. In particular, FIG. 6 shows the frequency spectrum with RF band of interest extending from $f_{min}$ to $f_{max}$. The center frequency of the received channel is $f_{RF}$, the desired signal bandwidth is 2BW. The desired channel of interest can be anywhere in the RF band $f_{min} < f_{RF} < f_{max}$. The graphical representation of FIG. 6 shows a $K^{th}$ harmonic of the switching frequency $f_s$ located in a desired channel. The voltage noise coupled into the analog circuitry can be calculated in accordance with equation (2), where:

$$\omega = 2\pi \cdot K \cdot f_s. \tag{7}$$

In order to shift the spur ($K^{th}$ harmonic of $f_s$) out of the channel of interest, the switching frequency of the DC-DC converter must be shifted by $\Delta f$ such that none of the harmonics of fs+$\Delta f$ fall in the channel of interest. One aspect for this technique is to make sure that fs>2BW. If $\Delta f$ is a positive frequency shift (e.g., a frequency shift), then the spur at Kfs is shifted to a higher frequency at Kfs+K$\Delta f$. To make sure that this spur at Kfs+K$\Delta f$ is outside the channel band, the following condition applies:

$$K(f_s + \Delta f) > f_{RF} + BW \tag{8}$$

However, $\Delta f$ cannot be arbitrarily large because the spurs $(K-1)(f_s+\Delta f)$ and lower may become in the channel of interest. The necessary condition to avoid this scenario is:

$$(k-1)(f_s + \Delta f) < f_{RF} - BW \tag{8}$$

Thus, the value of $\Delta f$ ranges from $$\frac{(f_{RF} - Kf_s) + BW}{K} \text{ to } \frac{(f_{RF} - (K-1)f_s) - BW}{K-1}.$$

The small frequency shift should not disrupt the operation of DC-DC converter. For example, UHF channel 16 in North America extends from 476 MHz to 482 MHz ($f_{RF}$=479 MHz and BW=3 MHz). The DC-DC switching frequency must be set higher than the channel bandwidth which is 6 MHz. Assuming $f_s$=8 MHz, the $80^{th}$ harmonic is located at 480 MHz which is inside the desired channel. According to equations (8) and (9), the required switching frequency shift must satisfy the condition 25 KHz<$\Delta f$<50.633 KHz. Therefore, the switching frequency needs to be changed by only 0.31% to 0.63%, which is very small and will not disrupt the operation of the DC-DC converter.

The array of impulses shown in FIG. 5, assumes a perfect periodic current waveforms as shown in the graphical representation 400 of FIG. 4. However, in the presence of a variable load current to the DC-DC converter, duty cycle is modulated by the variable load current. Furthermore, the reference clock has finite phase noise. These effects cause spurs of the switching frequency to be spread over non-zero bandwidth as shown in the graphical representation of FIG. 7. In particular, FIG. 7, with reference to FIGS. 1 through 6, is a graphical representation 700 illustrating optimal channel (e.g., the channel of interest along the Y axis) placement in the middle of two $f_s$ harmonics (along the X axis) according to an embodiment herein. Thus, to minimize receiver degradation due to spurs, it is optimal to place the channel of interest in the middle between two $f_s$ harmonics to avoid digital spurs contamination. For each received channel, the frequency shift (e.g., the switching frequency is calculated) such that the received channel is located in the middle between two consecutive spurs (harmonics of $f_s$). This can be derived as follows: after the DC-DC switching frequency is shifted by $\Delta f$, the frequency $f_{RF}$ sits in the middle between harmonics $(K-1)(f_s+\Delta f)$ and $K(f_s+\Delta f)$. Therefore, the equation can be expressed as:

$$K(f_s+\Delta f)-f_{RF}=f_{RF}-(K-1)(f_s+\Delta f) \tag{10}$$

Hence, the frequency shift $\Delta f$ is calculated in accordance with the equation:

$$\Delta f = \frac{2f_{RF}}{2K-1} - f_s \tag{11}$$

The value of K is chosen for every channel of interest such that the absolute value of frequency shift |$\Delta f$| is minimized (e.g., for easier implementation and minimum impact on DC-DC performance).

Figure 8:
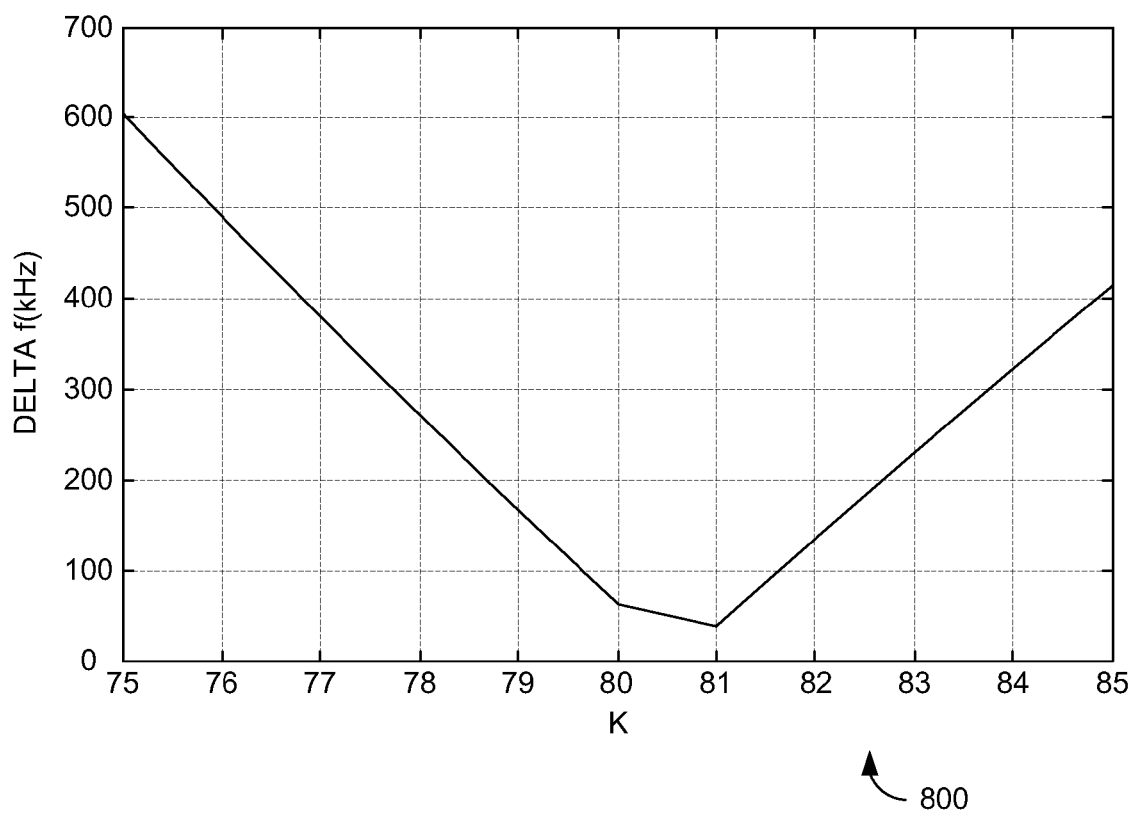
FIG. 8 illustrates a graphical representation the absolute frequency shift plotted for different values of K according to an embodiment herein.

FIG. 8, with reference to FIGS. 1 through 7, illustrates a graphical representation 800 of the absolute frequency shift plotted for different values of K according to an embodiment herein. In particular, FIG. 8 illustrates a graphical representation of magnitude of optimum frequency shifts |$\Delta f$| for different values of K. In one embodiment, the value of K ranges from 75 to 85 as shown in FIG. 8 assuming $f_{RF}$=641 MHz. FIG. 8 shows the minimum frequency shift (e.g., $\Delta f$ along the Y axis) is achieved for K=81 (along X axis), for which $\Delta f$ is −37.267 KHz. This will result in a new sampling frequency (e.g., a new switching frequency) of 7.9627 MHz and this will place $f_{RF}$ at 641 MHz in the middle of the two harmonics at 637.02 MHz and 644.98 MHz.

Figure 9:
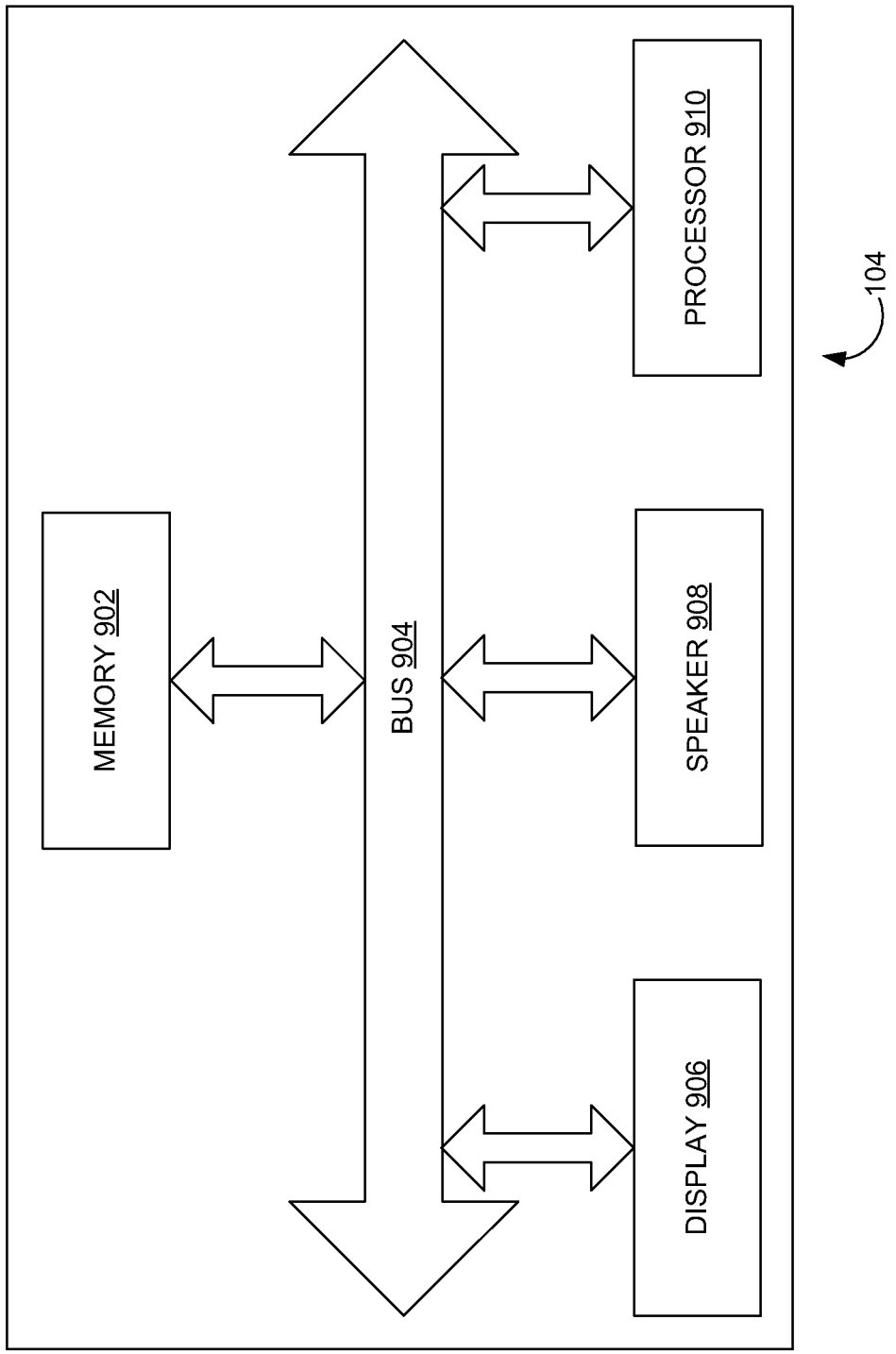
FIG. 9 illustrates a schematic diagram of the wireless receiver of FIG. 1 used in accordance with the embodiments herein.

FIG. 9, with reference to FIGS. 1 through 8, illustrates a schematic diagram of the wireless receiver 104 of FIG. 1 having an a memory 902 having a set of computer instructions, a bus 904, a display 906, a speaker 908, and a processor 910 capable of processing a set of computer instructions to perform any one or more of the methodologies herein, according to an embodiment herein. The processor 910 may also enable digital content to be consumed in the form of video for output via one or more displays 906 or audio for output via speaker and/or earphones 908. The processor 910 may also carry out the methods described herein and in accordance with the embodiments herein.

Digital content may also be stored in the memory 902 for future processing or consumption. The memory 902 may also store program specific information and/or service information (PSI/SI), including information about digital content (e.g., the detected information bits) available in the future or stored from the past. A user of the wireless receiver 104 may view this stored information on the display 906 and select an item of for viewing, listening, or other uses via input, which may take the form of keypad, scroll, or other input device(s) or combinations thereof. When digital content is selected, the processor 910 may pass information. The content and PSI/SI may be passed among functions within the interactive communication unit 104 of FIG. 1 of the user using the bus 904.

Figure 10:
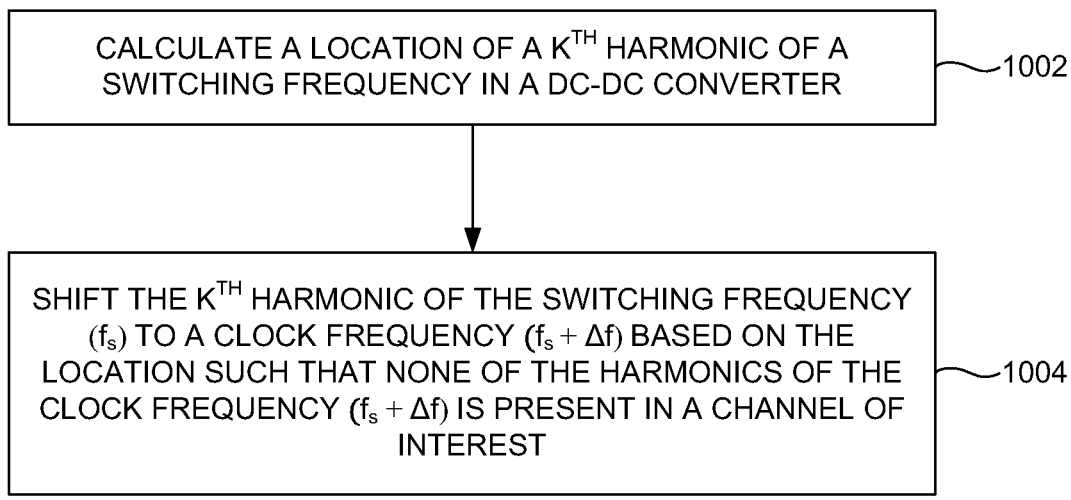
FIG. 10 is a flow diagram illustrating a method for digital controlling switching noise spurs in the DC-DC converter of FIG. 2 and the step-down DC-DC converter of FIG. 3 according to an embodiment herein.

FIG. 10 is a flow diagram illustrating a method for digital controlling switching noise spurs in the DC-DC converter 200 of FIG. 2 and the step-down DC-DC converter 300 of FIG. 3 according to an embodiment herein. In step 1002, a location of a $K^{th}$ harmonic of a switching frequency in the DC-DC converter is calculated. In step 1004, the $K^{th}$ harmonic of the switching frequency ($f_s$) is shifted to a clock frequency ($f_s+\Delta f$) based on the location such that none of the harmonics of the clock frequency ($f_s+\Delta f$) is present in a channel of interest.

The Kth harmonic of the switching frequency may be shifted to a higher frequency at $Kf\_s+K\Delta f$, when $\Delta f$ is the frequency shift. The channel of interest at $f_{RF}$ may be placed in the middle between two consecutive harmonics at (K–1) ($f_s+\Delta f$) and $K(f_9+\Delta f)$. $\Delta f$ is calculated such that a received channel is located in the middle of two consecutive harmonics of the sampling frequency ($f_s$). The sampling frequency is also referred as the switching frequency. The switching frequency may be larger than the channel bandwidth 2BW. The $K^{th}$ harmonic of the sampling frequency ($f_s$) is shifted by '$\Delta f$' when the switching frequency ($f_s$) is greater than 2BW. $\Delta f$ ranges from $$\frac{(f_{RF} - Kf_s) + BW}{K} \text{ to } \frac{(f_{RF} - (K-1)f_s) - BW}{K-1},$$

and $f_{RF}$ is center frequency of the received channel. $\Delta f$ is calculated in accordance with $$\Delta f = \frac{2f_{RF}}{2K-1} - f_s.$$

the shifting of $K^{th}$ harmonic of the switching frequency ($f_s$) is performed and controlled by a clock phase lock loop (PLL) (e.g., or a fractional phase lock loop (PLL)).

The above technique of shifting the switching frequency $f_s$ by the frequency $\Delta f$ can be implemented in any receiver/transmitter (e.g., wireless, TV tuner, cell phones, and/or satellite tuners, etc.). Further, this technique of digitally controlling the spurs can also be used in disk-drives, modems, wire line applications or any application that require isolation of DC-DC switching noise from a sensitive analog circuitry. The fine control of the switching of noise spurs can be achieved using a clock phase lock loop (PLL). One aspect of this technique is that it completely avoids the issue of DC-DC switching noise coupling into a radio frequency (RF) receiver which enables integration of the DC-DC converter with the sensitive analog circuitry. Further, this technique can also be implemented in technologies other than CMOS such as BiC-MOS (bipolar junction transistor and the CMOS transistor— in a single integrated circuit device), SiGe, Bipolar and/or GaAs, etc.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An integrated circuit for digital controlling switching noise spurs in a receiver by shifting a switching frequency ($f_s$) to a clock frequency ($f_s+\Delta f$) to move a $K^{th}$ harmonic of said switching frequency ($f_s$), said integrated circuit comprising:
   a spur controlled clock that operates said clock frequency ($f_s+\Delta f$), wherein none of the harmonics of said clock frequency ($f_s+\Delta f$) is present in a channel of interest, wherein said switching frequency is larger than a bandwidth 2BW of the channel of interest; and
   a DC-DC converter circuitry comprising:
   a first power switch, and
   a second power switch, wherein said first power switch and said second power switch are driven by said clock frequency ($f_s+\Delta f$),
   wherein $\Delta f$ ranges from $$\frac{(f_{RF} - Kf_s) + BW}{K} \text{ to } \frac{(f_{RF} - (K-1)f_s) - BW}{K-1},$$

and
   wherein $f_{RF}$ is a center frequency of the channel of interest.

2. The integrated circuit of claim 1, wherein said $K^{th}$ harmonic of said switching frequency is shifted to a higher frequency at $Kf_s+K\Delta f$, when $\Delta f$ is a frequency shift.

3. The integrated circuit of claim 1, wherein said channel of interest at $f_{RF}$ is placed between two consecutive harmonics at (K–1)($f_s+\Delta f$) and K($f_s+\Delta f$).

4. The integrated circuit of claim 3, wherein $\Delta f$ is calculated in accordance with $$\Delta f = \frac{2f_{RF}}{2K-1} - f_s.$$

5. The integrated circuit of claim 1, wherein a value of K is chosen to minimize the switching frequency shift $\Delta f$ for the channel of interest at $f_{RF}$.

6. A combined integrated circuit for digital controlling switching noise spurs in a receiver by shifting a switching frequency ($f_s$) to a clock frequency ($f_s+\Delta f$) to move a $K^{th}$ harmonic of said switching frequency ($f_s$), said combined integrated circuit comprising:
   a spur controlled clock that operates said clock frequency ($f_s+\Delta f$), wherein none of the harmonics of said clock frequency ($f_s+\Delta f$) is present in a channel of interest, wherein said switching frequency is larger than a bandwidth 2BW of the channel of interest; and
   a DC-DC converter circuitry operatively coupled to analog circuitry, wherein said DC-DC converter comprises:
   a first power switch, and
   a second power switch, wherein said first power switch and said second power switch are driven by said clock frequency ($f_s+\Delta f$),
   wherein $\Delta f$ is calculated in accordance with an equation:

$$\Delta f = \frac{2f_{RF}}{2K-1} - f_s,$$

and
   wherein $f_{RF}$ is a center frequency of the channel of interest.

7. The combined integrated circuit of claim 6, wherein said $K^{th}$ harmonic of said switching frequency is shifted by $\Delta f$ when said switching frequency is greater than the channel bandwidth 2BW.

8. The combined integrated circuit of claim 6, wherein an absolute value of $\Delta f$ is determined based on a value of K and $f_{RF}$.

9. The combined integrated circuit of claim 6, wherein the value of K is chosen to minimize the switching frequency shift $\Delta f$ for the channel of interest at $f_{RF}$.

10. The combined integrated circuit of claim 6, wherein $\Delta f$ is a minimum frequency shift of −37.267 KHz when the value of K is 81, $f_{RF}$ is 481 MHz, and $f_s$ is 8 MHz.

11. The combined integrated circuit of claim 6, wherein $\Delta f$ ranges from $$\frac{(f_{RF} - Kf_s) + BW}{K} \text{ to } \frac{(f_{RF} - (K-1)f_s) - BW}{K-1}.$$

12. A method for digital controlling switching noise spurs in a DC-DC converter, said method comprising:
calculating a location of a $K^{th}$ harmonic of a switching frequency in said DC-DC converter; and
shifting said $K^{th}$ harmonic of said switching frequency ($f_s$) to a clock frequency ($f_s+\Delta f$) based on said location such that none of the harmonics of said clock frequency ($f_s+\Delta f$) is present in a channel of interest,
wherein $\Delta f$ ranges from $$\frac{(f_{RF} - Kf_s) + BW}{K} \text{ to } \frac{(f_{RF} - (K-1)f_s) - BW}{K-1},$$

and wherein $f_{RF}$ is a center frequency of the channel of interest and BW is a bandwidth of the channel of interest.

13. The method of claim 12, further comprising shifting said $K^{th}$ harmonic of said switching frequency to a higher frequency at $Kf_s+K\Delta f$, when $\Delta f$ is a frequency shift.

14. The method of claim 12, wherein said channel of interest at $f_{RF}$ is placed between two consecutive harmonics at $(K-1)(f_s+\Delta f)$ and $K(f_s+\Delta f)$.

15. The method of claim 12, wherein $\Delta f$ is calculated such that the channel of interest is located between two consecutive harmonics of said switching frequency ($f_s$).

16. The method of claim 12, wherein said switching frequency is larger than 2BW.

17. The method of claim 12, wherein said $K^{th}$ harmonic of said switching frequency ($f_s$) is shifted by $\Delta f$ when said switching frequency ($f_s$) is greater than 2BW.

18. The method of claim 12, wherein $\Delta f$ is calculated in accordance with $$\Delta f = \frac{2f_{RF}}{2K-1} - f_s.$$

19. The method of claim 12, wherein said shifting said $K^{th}$ harmonic of said switching frequency ($f_s$) is performed and controlled by a clock phase lock loop (PLL).

* * * * *